(12) United States Patent
Piekarz

(10) Patent No.: US 7,616,978 B2
(45) Date of Patent: Nov. 10, 2009

(54) COMBINED NAVIGATION AND COMMUNICATION DEVICE

(75) Inventor: Roman Piekarz, Mielec (PL)

(73) Assignee: Bury Sp. z.o.o., Mielec (PL)

( * ) Notice: Subject to any disclaimer, the term of this patent is extended or adjusted under 35 U.S.C. 154(b) by 353 days.

(21) Appl. No.: 11/383,569

(22) Filed: May 16, 2006

(65) Prior Publication Data

US 2008/0119222 A1    May 22, 2008

(30) Foreign Application Priority Data

May 17, 2005  (DE) ................ 10 2005 023 373
May 17, 2005  (DE) ................ 10 2005 023 374

(51) Int. Cl.
*H04M 1/00*    (2006.01)
(52) U.S. Cl. ............. 455/575.9; 455/556.1; 455/550.1; 340/539.13; 701/211
(58) Field of Classification Search .......... 455/556.1, 455/556.2, 550.1, 575.9; 701/211; 345/854; 340/539.13
See application file for complete search history.

(56) References Cited

U.S. PATENT DOCUMENTS

| | | | |
|---|---|---|---|
| 6,622,083 B1 | 9/2003 | Knockeart et al. | |
| 6,741,931 B1 * | 5/2004 | Kohut et al. | 701/209 |
| 7,050,945 B2 * | 5/2006 | Oba et al. | 702/188 |
| 2001/0029427 A1 * | 10/2001 | Nagaki et al. | 701/208 |
| 2001/0052861 A1 * | 12/2001 | Ohmura et al. | 340/988 |
| 2003/0027594 A1 * | 2/2003 | Pfoertner | 455/557 |
| 2003/0212479 A1 * | 11/2003 | Baghshomali et al. | 701/24 |
| 2004/0054469 A1 * | 3/2004 | Rentel | 701/211 |
| 2006/0106622 A1 * | 5/2006 | Lee | 705/1 |

FOREIGN PATENT DOCUMENTS

| | | |
|---|---|---|
| DE | 196 40 735 | 10/1996 |
| DE | 100 45 303 | 9/2000 |
| DE | 103 32 632 | 7/2003 |
| WO | WO 03/050557 | 6/2003 |
| WO | WO 2005/004431 | 1/2005 |

* cited by examiner

*Primary Examiner*—Danh C Le
(74) *Attorney, Agent, or Firm*—Witham Curtis Christofferson & Cook, PC

(57) ABSTRACT

A combined navigation and communication device (1) with mobile telephone module (2), integrated into the device (1), with telephone hands-free function, with a navigation unit (3) for route guidance and with a display unit (5), activated jointly by the mobile telephone module (2) and the navigation unit (3), is constructed in such a manner that the mobile telephone module (2) is used for receiving user-specific data from an external mobile telephone (20) and subsequently providing a user-specific mobile telephone function by means of the combined navigation and communication device (1).

20 Claims, 3 Drawing Sheets

COMBINED NAVIGATION AND COMMUNICATION DEVICE

The invention relates to a combined navigation and communication device with mobile telephone module, integrated into the device, with telephone hands-free function, with a navigation unit for route guidance and with a display unit jointly activated by the mobile telephone module and the navigation unit.

Separate telephone hands-free systems for a mobile telephone are adequately well known for installation in motor vehicles. As a rule, these telephone hands-free systems have a holder for accommodating a mobile telephone which is set up for wireless communication in a mobile telephone network. The holder is connected to a control arrangement for controlling at least one hands-free function for the mobile telephone.

Furthermore, navigation devices are known which can also be installed in a motor vehicle and are used for route guidance. The navigation can be calculated either on board by the navigation device itself or off board in a central station.

It is also known to couple the hands-free system for the mobile telephone with the navigation device in such a manner that they jointly utilize a display unit and operating unit. In these coupled devices, however, there is always still a separate mobile telephone which is inserted into a holder and connected to a hands-free system.

Disadvantageously, the conventional systems always require a mobile telephone to be inserted into a holder in order to at least make contact with the antenna integrated in the motor vehicle or at least two different devices to be installed in the motor vehicle.

It is, therefore, the first object of the invention to create an improved combined navigation and communication device which provides for little installation expenditure in the vehicle and simple use.

It is a second object of the invention to create an improved combined navigation and communication device which provides for navigation on the basis of current navigation data without elaborate updating procedures, for simple use and has low installation expenditure in the vehicle.

The object is achieved by means of the combined navigation and communication device of the type initially mentioned in that the mobile telephone module is designed for receiving user-specific data from an external mobile telephone and subsequent provision of a user-specific mobile telephone function by means of the combined navigation and communication device.

The integration of a mobile telephone into the navigation device has the advantage that no separate mobile telephone is required for using the hands-free system in the vehicle. Instead, the user-specific data required for using the mobile radio network are called up by the mobile telephone module from an external mobile telephone via a data transmission interface so that the mobile telephone module subsequently receives the user-specific functionality. For this data transmission, the so-called rSAP standard has recently become available. According to the specifications of the rSAP standard, the mobile telephone receiving the user specific data logs on in the mobile radio network and obtains control over the user-specific subscriber number. The mobile telephone sending the user-specific data, in contrast, is largely deactivated.

The objects are achieved by means of the combined navigation and communication device of the type initially mentioned in that the mobile telephone module is constructed for receiving the user-specific data from an external mobile telephone and subsequently providing a user-specific mobile telephone function by means of the combined navigation and communication device. The combined navigation and communication device is constructed for dialling a navigation center via a mobile radio telephone network, transmitting at least one route calculation request to the navigation center, for receiving at least one calculated route guidance from the navigation center via the mobile radio telephone network with the integrated mobile telephone module and displaying the route guidance on the display unit.

It is thus proposed to combine a mobile telephone module with a navigation device together in one device and to activate the mobile telephone module by accessing user-specific data from an external mobile telephone and to transmit the functionality of the external mobile telephone to the mobile telephone module. For the route planning, an enquiry is then started at a navigation center with the aid of the activated mobile telephone module so that, without having to keep current navigation data ready in the combined navigation and communication module, precise route guidance can take place on the basis of the route data received from the navigation center.

The user-specific data are preferably access, system adjustment and useful data so that, apart from the access authorization codes, user-specific telephone directory entries, short messages, call lists and possibly also ring tones, signalling adjustments etc. are available in the mobile telephone module of the combined navigation and communication device. User-specific data can also be information about the navigation center to be dialled for off-board navigation.

The combined navigation and communication device preferably has a data memory for user-specific data. It is particularly advantageous if a preference list of external mobile telephones is stored in the data memory of the mobile telephone module in order to control the reception of the user-specific data in dependence on the preference list. When two or more external mobile telephones attempt to transfer their functionality to the mobile telephone module, the preference list can be used by the combined navigation and communication device for selecting which external mobile telephone receives priority.

The user-specific data are accessed by the combined navigation and communication device for providing a user-specific mobile telephone function preferably automatically when an external mobile telephone contained in the preference list comes within transmission range of the combined navigation and communication device. Thus, for example, when a driver enters his vehicle, the function of his portable mobile telephone is automatically transmitted to the combined navigation and communication device installed in the vehicle without any action by the driver being required. It is particularly advantageous if the combined navigation and communication device has a radio data transmission interface which is separate from a transceiving unit of the mobile telephone module for communication with the mobile telephone network, particularly a Bluetooth interface, for receiving the user-specific data. Data transmission then takes place without a line-of-sight connection being required between the mobile telephone and the data transmission interface of the combined navigation and communication device. The external mobile telephone can thus remain in the pocket of the user.

However, it is also conceivable that the combined navigation and communication device has an optical data transmission interface, particularly an infrared interface, for receiving the user-specific data.

It is also advantageous if at least one loudspeaker is integrated in a common housing of the device and is connected directly or indirectly to the mobile telephone module and to the navigation unit. The navigation and hands-free system can thus be implemented in one housing without requiring additional connections for the audio reproduction. The housing can be portable so that it can be used by a user in different vehicles, for example his own car and hire cars.

It is also advantageous if an interface unit for the telephone hands-free functions is integrated in the device and connected at least to the mobile telephone module. The hands-free functionality of the mobile telephone and possibly a priority control for the audio and visual output is then supported by the interface unit integrated in the device and not by an external hands-free system which can be connected to the combined navigation and communication device.

It is also advantageous if the device has a satellite positioning receiving module connected to the navigation module and integrated into the device for satellite-supported position findings and/or broadcast receiver with traffic data extraction unit for extracting traffic data from broadcast signals. Integrating the satellite positioning receiving module and the broadcast receiver in the housing or at the housing foot of the device has the advantage that no additional connection of external positioning and/or traffic data modules is required. Naturally, such connections for external modules can be provided additionally or alternatively.

It is also advantageous if a data interface, particularly a USB connection, is integrated in the device and is connected to the loudspeakers and/or a hands-free system connection for single- or multichannel audio reproduction of audio data which can be read into the device via the data interface. Thus, a music replay device can be additionally implemented. The data interface can also be additionally used for programming the combined navigation and communication device or for downloading new control software and entering navigation data.

A SIM card reader can also be integrated in the device and connected to the mobile telephone for reading the user-specific data from a data memory integrated in a SIM card. Such a SIM (subscriber identity module) card is used for storing the user-specific data in conventional mobile telephones. This SIM card is inserted into the portable mobile telephone so that the mobile telephone receives the user-specific mobile telephone functions and is operationally ready anyhow. With the aid of this SIM card reader, the combined navigation and communication device can also be used where no rSAP-capable external mobile telephone is available by means of which user-specific data can be transmitted.

The combined navigation and communication device is preferably operated and controlled by an input unit jointly used by the mobile telephone module and the navigation unit. This can be, for example, the display unit constructed as touch screen, and/or a remote control.

It is particularly advantageous if the combined navigation and communication device has an emergency call key and is set up for automatically dialling an emergency call center when the emergency call key is operated, with the aid of the integrated mobile telephone module and transmitting current position data to the emergency call center.

Correspondingly, at least one information call key can be integrated in the combined navigation and communication device in order to transmit information from and to a central station with the aid of the integrated mobile telephone module.

In the text which follows, the invention will be explained in greater detail by way of example with reference to the attached drawing, in which.

Figure 1:
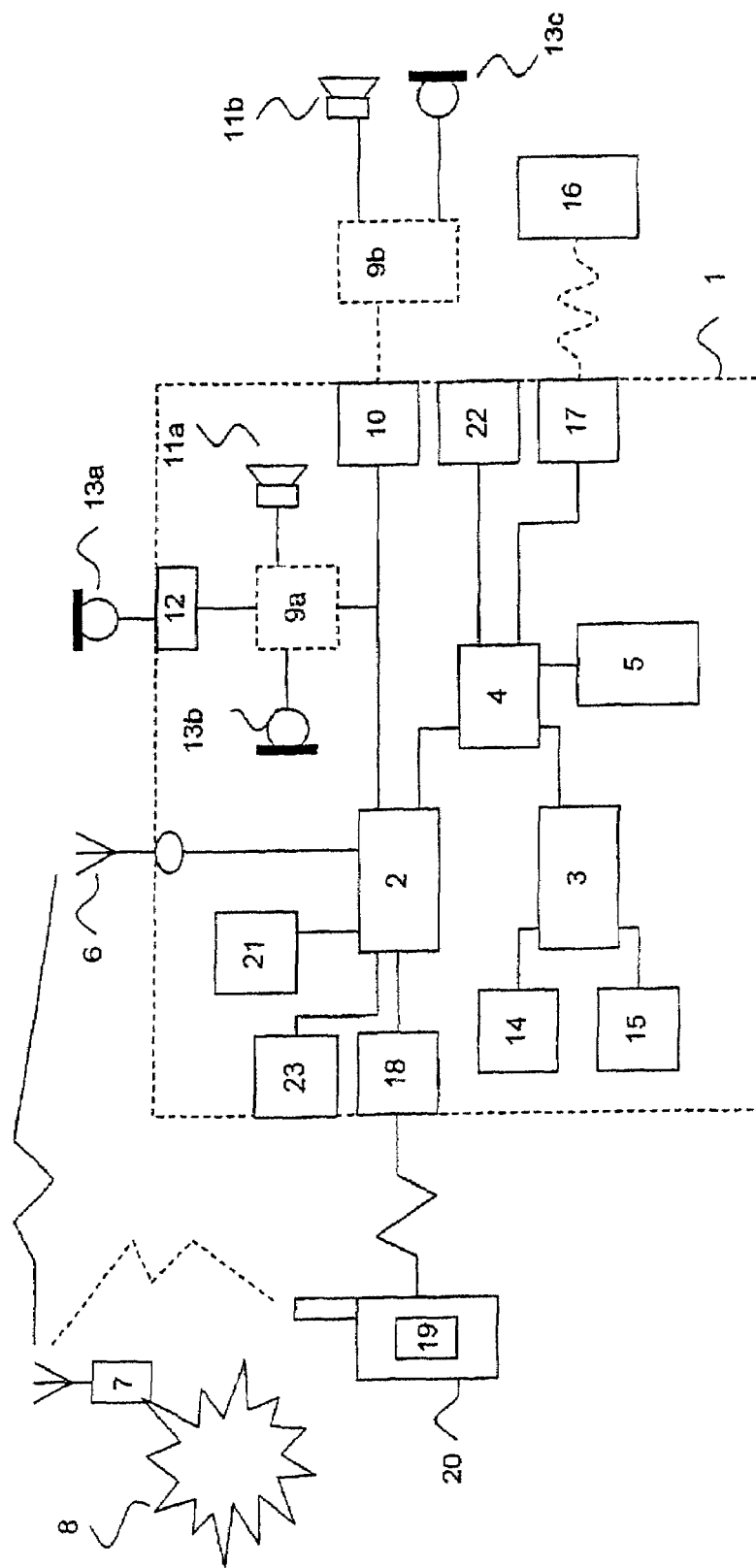
FIG. 1 shows a block diagram of a combined navigation and communication device.

FIG. 1 shows a block diagram of a combined navigation and communication device 1 into which a mobile telephone module 2 and a navigation unit 3 is integrated. The mobile telephone module 2 and the navigation unit 3 utilize a common display unit 5 via a common control unit 4.

The display unit 5 can be constructed, for example, as touch screen in order to operate the combined navigation and communication device 1.

The mobile telephone module 2 has a transceiving unit, not shown, in order to communicate with base stations 7 of a mobile radio telephone network 8, and set up telephone communication links via an antenna 6 in the vehicle, which can be connected to the combined navigation and communication device 1. The mobile telephone module 2 is connected via an interface unit 9a, integrated in the combined navigation and communication device 1, for telephone hands-free functions or via a connection 10 to an external interface unit 9b, installed in the vehicle, for telephone hands-free functions in order to reproduce audio signals, e.g. in stereo, via loudspeakers 11a integrated in the device 1 and/or external loudspeakers 11b installed in the vehicle.

The internal interface unit 9a can be connected to an external microphone 13a via a connecting contact 12 or directly to a microphone 13b integrated into the housing of the device 1. Correspondingly, the external interface unit 9b for telephone hands-free functions can have a connection to an external microphone 13c installed in the vehicle.

The navigation unit 3 is connected to a satellite positioning receiving module 14 integrated in the device 1 for position finding. Furthermore, a broadcast receiver 15 with a traffic data extraction unit for extracting traffic data from broadcast signals TMC (traffic message channel receiver) which is connected to the navigation unit 3, is integrated into the device 1. Optionally, it is also possible that only connections for external satellite positioning receiving modules and external TMC receivers are provided at the device 1. From the position data of the satellite positioning receiving module 14 and the traffic data of the TMC receiver 15, the navigation unit 3 can work out route recommendations for route guidance, which are displayed on the common display unit 5, directly by on-board navigation or indirectly, preferably by utilizing the mobile telephone module 2, by off-board navigation in a navigation center.

The combined navigation and communication device is operated, for example, via a remote control 16, which can be mounted on the steering wheel of the vehicle, which is connected to the mobile telephone module 2 and the navigation unit 3 via a data transmission interface 17 of the device. The data transmission interface 17 can be, for example, a radio interface, for example a Bluetooth interface, or an optical interface, for example an infrared interface.

A user-specific mobile telephone function of the combined navigation and communication device is provided by user-specific data such as access, system adjustment and useful data being transmitted from a SIM card 19 of an external mobile telephone 20 to the mobile telephone module 2 via a data transmission interface 18. The functionality of the external mobile telephone 20 is provided in the mobile telephone module 2 in that the mobile telephone module 2, if necessary repeatedly accesses the user-specific data stored in the external mobile telephone 20 so that a continuous communication link must exist. When the communication link is broken down, control is returned to the external mobile telephone. Optionally, however, the user-specific data can also be stored in a data memory 21 connected to the mobile telephone module 2.

In a preferred embodiment, off-board navigation is performed by dialling a navigation center via a mobile radio telephone network with the aid of the mobile telephone module 2 in order to calculate a route from a starting point to a destination point, possibly via intermediate destinations, on the basis of current map material available in the navigation center and possibly current traffic information (congestion, construction sites, diversions etc.). For this purpose, a route calculation enquiry is sent to the navigation center and the route guidance calculated there is received again with the aid of the mobile telephone module 2. The route calculation enquiry is then displayed on the display unit 5. In addition, or as an alterative, audio route guidance information can also be output with the aid of the integrated hands-free system.

A user-specific mobile telephone function of the combined navigation and communication device is provided in that user-specific data such as access, system adjustment and useful data are transmitted via a data transmission interface 18 from a SIM card 19 of an external mobile telephone 20 to the mobile telephone module 2. The functionality of the external mobile telephone 20 is provided in the mobile telephone module 2 in that the mobile telephone module 2 if necessary, repeatedly accesses the user-specific data stored in the external mobile telephone 20 so that a continuous communication link must exist. When the communication link is broken down, the control is returned again to the external mobile telephone. As an option, however, the user-specific data can also be stored in a data memory 21 connected to the mobile telephone module 2. For the off-board navigation, additional user-specific data can be relevant information for route guidance, for example preferences of traffic paths, average travelling speeds, points regularly travelled to etc.

For example, the rSAP standard is utilized in which, after the use-specific data have been transmitted, the external mobile telephone 20 is largely deactivated and the mobile telephone module 2 of the combined navigation and communication device 1 takes over the function of the external mobile telephone 20 transmitting the user-specific data. The combined navigation and communication device 1 then automatically registers with at least one base station 7 of the mobile radio network 8 and subsequently receives calls directed to the user-specific directory number or can set up communication links for the user-specific directory number.

Optionally, a data interface 22, for example a USB connection, can be integrated in the combined navigation and communication device 1 in order to update the control software contained in the combined navigation and communication device 1, to transmit program and useful data for the mobile telephone module 2 and/or the navigation unit 3 to and from external devices and, in particular, to reproduce audio data contained on an external device, for example a USB data memory, via the at least one internal loudspeaker 11a or the connection 10 for the external control unit 9b for telephone hands-free functions in a single- or multi-channel manner (mono, stereo, Dolby surround etc.).

Optionally, a SIM card reader 23 can also be integrated in the device in order to introduce a SIM card utilized for mobile telephones 20, which contains user-specific data, into the SIM card reader 23 and to transmit the data contained in the SIM card for utilization by the mobile telephone module 2. Thus, the mobile telephone function can be activated by inserting a SIM card.

The mobile telephone module 2 is intended to have a hands-free functionality and headset functionality in a manner known per se in order to provide the hands-free function also in connection with mobile telephones which are not rSAP-capable. The hands-free profile regulates communication between hands-free device and mobile telephone in order to set up voice connections to the mobile telephone and to remotely control the latter. The headset profile regulates communication between the mobile telephone and an external loudspeaker and microphone and the remotely controlled or automatic call acceptance.

Figure 2:
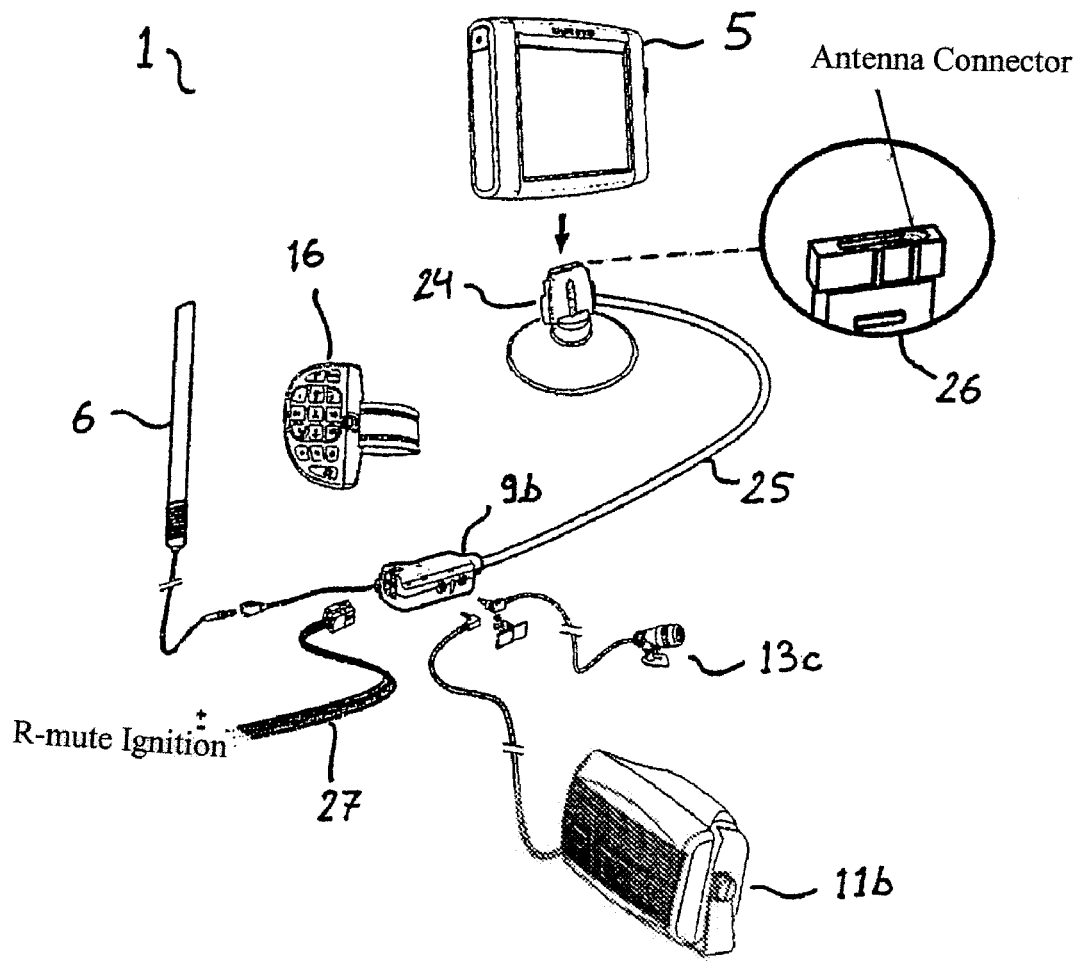
FIG. 2 shows a perspective view of the components of the combined navigation and communication device.

FIG. 2 shows a perspective view of the components of the combined navigation and communication device 1 in which the mobile telephone module 2 outlined in FIG. 1, the navigation unit 3, the control unit 4 and the display unit 5 are integrated in a common housing. The housing can be plugged onto a holder 24 which is connected to an external interface unit 9b for telephone hands-free functions by means of a connecting cable 25. A plug-in contact arrangement including an antenna connection for an external antenna 6 are located in the head 26 of the holder 24.

The external interface unit 9b is connected to the on-board system (+, −) by means of a pluggable connecting cable 27 and has a line for muting (R-mute) and a line for the ignition (ignition).

Furthermore, an external loudspeaker 11b with a connecting cable and a plug-in contact connection for connection to the external interface unit 9b is provided. Similarly, an external microphone 13c can be connected to the external interface unit 9b via a connecting cable and a plug-in contact connection.

The combined navigation and communication device 1 is operated via a remote control 16, which for example, can be attached to the steering wheel of a vehicle by means of a clamping belt.

Figure 3:
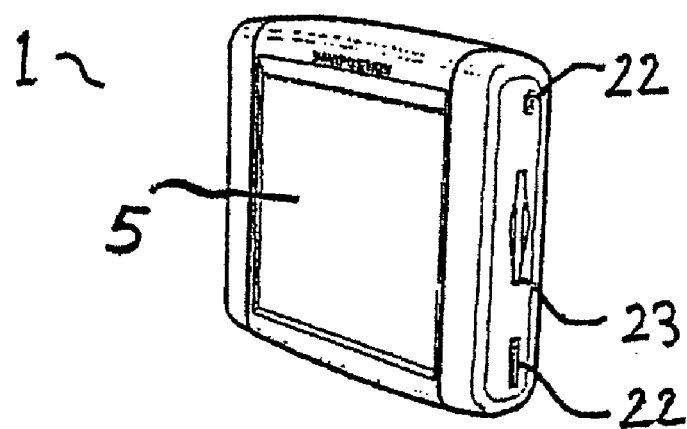
FIG. 3 shows a perspective front view of the display unit for the navigation and communication device from FIG. 2.

FIG. 3 shows a perspective front view of the display unit 5 in which a mini USB connection is provided on one side and a standard USB connection is provided as data interface 22. Furthermore, a slot is provided for introducing a SIM card into the SIM card reader 23 integrated in the display unit 5.

Figure 4:
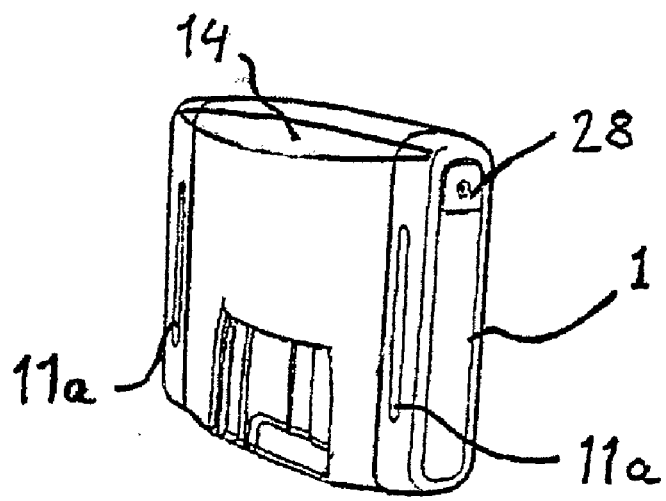
FIG. 4 shows a perspective rear view of the display unit from FIG. 3.

FIG. 4 shows a perspective rear view of the display unit 5. It can be seen that, apart from an on/off switch 28 on the side edge, two loudspeakers 11a are provided at the rear for forming a stereo loudspeaker system. On the top edge of the rear wall, a satellite positioning receiving module 14 in the form of a GPS receiver is also integrated in the housing.

The invention claimed is:

1. A combined navigation and communication device (1) with mobile telephone module (2), integrated into the device (1), with telephone hands-free function, with a navigation unit (3) for route guidance and with a display unit (5) jointly activated by the mobile telephone module (2) and the navigation unit (3), wherein the mobile telephone module (2) comprises a transceiving unit for communication with a mobile telephone network which receives user-specific data from an external mobile telephone (20) and subsequently providing a user-specific mobile telephone function by means of the combined navigation and communication device (1).

2. The combined navigation and communication device (1) as claimed in claim 1, wherein the user-specific data are access, system adjustment and/or useful data.

3. The combined navigation and communication device (1) as claimed in claim 1, wherein the user-specific data are automatically received when an external mobile telephone (20) contained in the preference list passes into the transmission range of the combined navigation and communication device (1).

4. The combined navigation and communication device (1) as claimed in claim 1, wherein the combined navigation and communication device (1) has an optical data transmission interface (18), particularly an infrared interface, for receiving the user-specific data.

5. The combined navigation and communication device (1) as claimed in claim 1, wherein the combined navigation and communication device (1) has a radio data transmission interface (18) separate from a transceiving unit of the mobile telephone module (2) for telephone communication via the mobile telephone network, particularly a Bluetooth interface, for receiving the user specific data.

6. The combined navigation and communication device (1) as claimed in claim 1, wherein there is at least one loudspeaker integrated into a common housing of the device and connected directly or indirectly to the mobile telephone module (2) and the navigation unit (3).

7. The combined navigation and communication device (1) as claimed in claim 1, wherein a control unit (4) for telephone hands-free functions is integrated in the device (1) and connected to at least the mobile telephone module (2).

8. The combined navigation and communication device (1) as claimed in claim 1, wherein the device (1) has a satellite positioning receiving module, connected to the navigation module (3) and integrated in the device (1), for satellite-supported position finding and/or broadcast receivers with traffic data extraction unit for extracting traffic data from broadcast signals.

9. The combined navigation and communication device (1) as claimed in claim 1, wherein a data interface (22), particularly a USB connection, is integrated in the device (1) and is connected to the loudspeakers and/or a hands-free system connection for single- or multichannel audio reproduction of audio data which can be read into the device (1) via the data interface (22).

10. The combined navigation and communication device (1) as claimed in claim 1, wherein a SIM card reader (23) is integrated in the device (1) and connected to the mobile telephone module (2) for reading out the user-specific data from a data memory integrated in a SIM card.

11. The combined navigation and communication device (1) as claimed in claim 1, wherein a SIM card reader (23) is integrated in the device (1) and is connected to the mobile telephone module (2) for reading out the user-specific data from a data memory integrated in a SIM card.

12. The combined navigation and communication device (1) with mobile telephone module (2), integrated into the device (1), with telephone hands-free function, with a navigation unit (3) for route guidance and with a display unit (5) jointly activated by the mobile telephone module (2) and the navigation unit (3), wherein the mobile telephone module (2) comprises a transceiving unit which receives user-specific data from an external mobile telephone (20) and providing a user-specific mobile telephone function by means of the combined navigation and communication device (1) and the combined navigation and communication device (1) is constructed for dialling a navigation center via a mobile radio telephone network with the aid of the integrated mobile telephone module (2), transmitting at least one route calculation enquiry to the navigation center, receiving at least one calculated route guidance from the navigation center with the aid of the integrated mobile telephone module (2) and displaying the route guidance on the display unit (5).

13. The combined navigation and communication device (1) as claimed in claim 12, wherein the user-specific data are access, system adjustment and/or useful data.

14. The combined navigation and communication device (1) as claimed in claim 12, wherein there is a separate radio data transmission interface (18) particularly a Bluetooth interface, for receiving the user-specific data from the external mobile telephone (20).

15. The combined navigation and communication device (1) as claimed in claim 12, wherein there is a connection for an external position finding module.

16. The combined navigation and communication device (1) as claimed in claim 15, wherein the position finding module is a satellite positioning receiving module (14).

17. The combined navigation and communication device (1) as claimed in claim 12, wherein the combined navigation and communication device (1) has an emergency call key and is set up for automatically dialing an emergency call center via the integrated mobile telephone module (2) and sending position data to the navigation center when the emergency call key is operated.

18. The combined navigation and communication device (1) as claimed in claim 12, wherein the device (1) has a broadcast receiver (15) with traffic data extraction unit for extracting traffic data from broadcast signals.

19. The combined navigation and communication device (1) as claimed in claim 12, wherein a data interface (22) is integrated in the device (1) and is connected to the loudspeakers and/or to a hands-free system connection for single- or multichannel audio reproduction of audio data which can be read into the device (1) via the data interface (22).

20. The combined navigation and communication device (1) as claimed in claim 19, wherein the data interface (22) is a universal serial bus (USB) connection.

\* \* \* \* \*